Nov. 22, 1960  J. F. ROESEL  2,960,811
ROTARY MOWER

Original Filed June 11, 1956  2 Sheets-Sheet 1

Inventor.
John F. Roesel.
Joseph B. Lindecker
Attorney

Nov. 22, 1960 J. F. ROESEL 2,960,811
ROTARY MOWER
Original Filed June 11, 1956 2 Sheets-Sheet 2
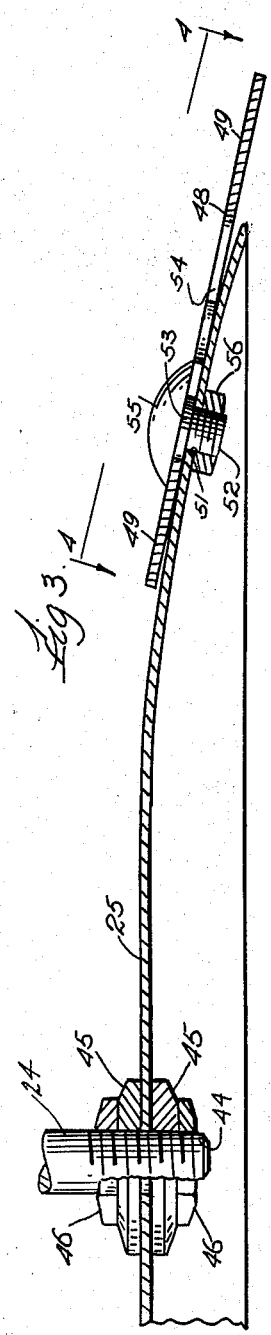
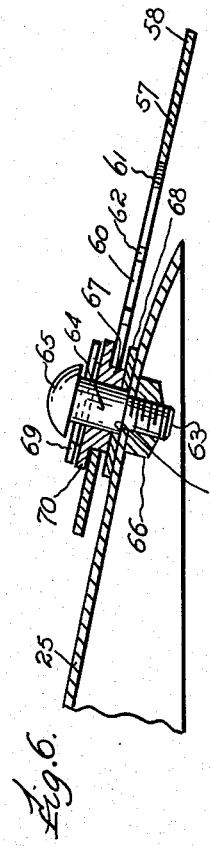
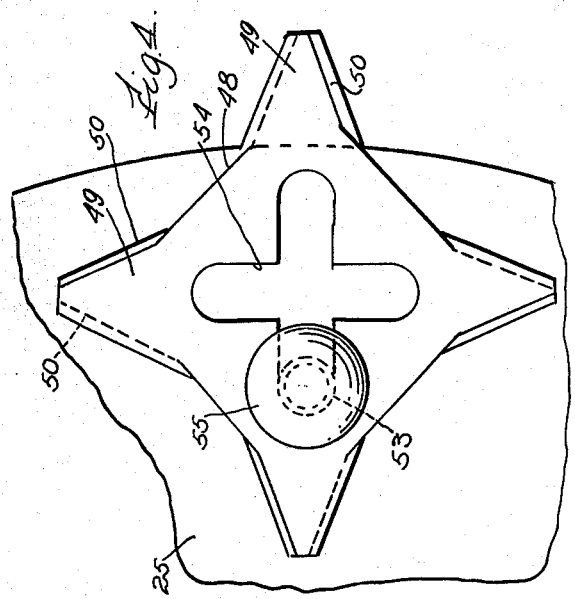
Inventor.
John F. Roesel,
Joseph B. Lindecker.
Attorney.

2,960,811

ROTARY MOWER

John F. Roesel, 1008 Camphor Lane, De Land, Fla.

Original application June 11, 1956, Ser. No. 590,479, now Patent No. 2,898,725, dated Aug. 11, 1959. Divided and this application June 5, 1959, Ser. No. 818,450

4 Claims. (Cl. 56—25.4)

This invention relates to improvements in rotary mowers as disclosed in my copending application, Serial No. 590,479, now U. S. Pat. No. 2,898,725, filed June 11, 1956, and of which the present application is a division.

It is an object of the present invention to provide a rotary mower having the retracting mower blades whereby to provide a means of mowing around posts, trees, poles and close beside fences, houses or other obstructions.

It is another object of the present invention to provide a rotary mower having retracting mower blades of the above type which will provide means of changing the width of the mower itself and also provide a means of mowing a wider strip than the distance between trees, posts, or other objects it may be desired to pass the mower through.

It is another object of the present invention to provide improved cutting means for rotary mowers.

It is still another object of the present invention to provide cutting means for rotary mowers of the above type in the form of a low cost, safe, efficient mower knife that does not require frequent sharpening.

Other objects of the invention are to provide an improved rotary mower; bearing the above objects in mind which is of simple construction, has a minimum number of parts, is inexpensive to manufacture and efficient in operation.

For other objects and for a better understanding of the invention, reference may be had to the following detailed description taken in connection with the accompanying drawing, in which:

Fig. 3 is an enlarged fragmentary vertical sectional view of the improved cutting means adapted to be used with the present invention;

Fig. 4 is a fragmentary top plan view looking along the line 4—4 of Fig. 3;

Fig. 5 is a view similar to Fig. 4 of a modified form of cutting means, and

Fig. 6 is a fragmentary vertical sectional view taken through the cutting means of Fig. 5.

Figure 1:
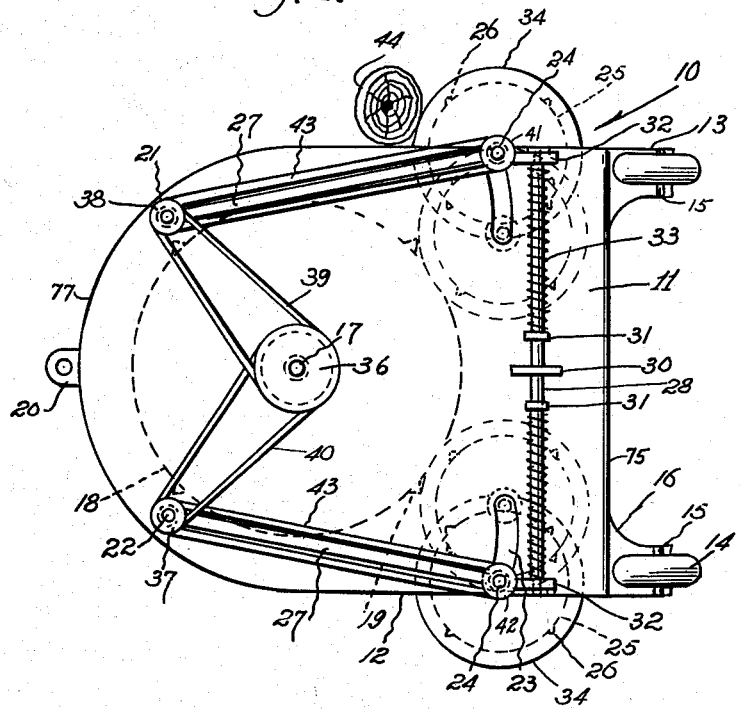
Figure 1 is a top plan view of a rotary mower having retracting blades illustrating a preferred embodiment of the present invention and illustrating in phantom the retracted position of the mower blades.
Figure 2:
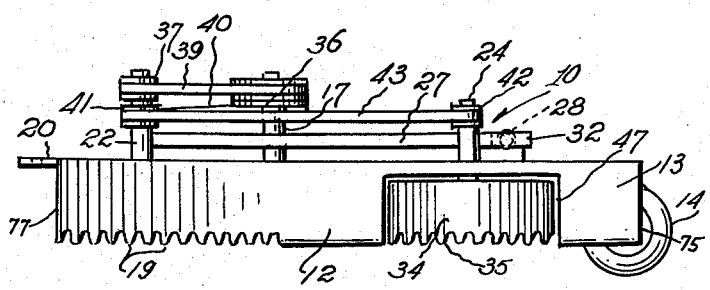
Fig. 2 is a side elevational view thereof.

Referring now more in detail to the drawing, and more particularly to Figs. 1 and 2, 10 indicates generally a rotary mower including the top plate 11 having the depending skirt 12, substantially as illustrated.

Guards 13 extend beyond the straight rear edge 75 of the frame and rotatably mount the wheels 14 on the inner faces thereof by means of the shafts 15 and bearing brackets 16, as will be obvious.

A shaft 17 is journalled at the center of the semi-circular portion of the plate 11 and fixedly mounts at the lower end thereof the central blade 18 having the cutters 19. Suitable means are provided for driving the shaft 17 in the usual manner of rotary mowers. Such means are well known to those skilled in the art and therefore will not be described in detail.

The semi-circular forward portion 77 of the skirt 12 serves as a guard for the central plate 18 and is provided at the lower edge with the teeth 19 through which pass the grass being cut for cooperative action with the rotating blade 18. A connecting lug 20 is mounted at the central portion of the guard.

A pair of oppositely disposed shafts 21 and 22 are journalled in the plate 11 at opposite sides thereof.

The plate 11 is provided at opposite sides with the arcuate slots 23 within which are rotatably and slidably positioned the shafts 24 in suitable manner, the rotary blades 25 being keyed to the lower ends of the shafts 24 and include the knives 26. The shafts 24 are journalled in the ends of the rigid links 27, the other ends of which are rotatably mounted on the shafts 21 and 22.

A transverse shaft 28 is mounted across the top of the plate 11 by means of a central bracket 30, and fixedly carries a pair of collars 31 on opposite sides of the bracket 30.

A guide and support 32 has a transverse horizontal bore in the rear end portion thereof and is slidably mounted on opposite ends of the shaft 28, the forward ends of the guide and support 32 having a vertical bore therein and being rotatably mounted on the shafts 24. A coil spring 33 sleeves each end of the shaft 28 intermediate the collars 31 and guide and supports 32 whereby to normally urge the supports 32, the shafts 24 and blades 25 to the extended position of Fig. 1.

A hollow cylindrical guide 34 is rotatably mounted on each of the shafts 24 below the plate 11 and is provided with the teeth 35 which receive the grass therethrough for cooperative action with the knives 26 upon rotation of the latter. The shafts 24 being free to travel inwardly within the slots when pressure is applied to the other sides of the guides 34, simply by compressing one or both of the springs 33.

The central shaft 17 is connected to the shafts 21 and 22 by means of the pulleys 36, 37 and 38 and the belts 39 and 40. The shafts 21 and 22 are connected to the shafts 24 by means of the pulleys 41 and 42 and the belts 43. The slots 23 will permit the retraction of the blades 25 and guards 34 against the action of springs 33, while the springs 33 will return the blades and guards to their extended position. The invention is also not limited to the type of rotary blade shown, though this has advantages, as it may be used with any type rotary blade.

In operation, when the mower frame is passing close to a tree, post or other object, the guard 34 when it strikes the object 44 will cause the blades 25 to retract, mowing close to the object and when past, will return to the extended position. The invention should prove helpful when used on mowers mowing in pastures on farms and on ranches and along highways where fence posts, trees sign posts and utility poles are to be mowed around. The guards 34 are circular and free to revolve independently of the mower blade, thus making it possible for the guards to roll around the object rather than slide by. This is helpful in mowing around fruit trees and others where it is desired not to damage the bark.

Referring now particularly to Figs. 3 and 4, there is shown an improved cutting means to be used with the blades 25, which it will be noted, are mounted at the lower ends of the shafts 17 and 24 by means of the externally threaded portion 44, as shown in Figure 3, washers 45 and nuts 46.

As shown in Fig. 2, the skirt 12 is provided with the rectangular openings 47 which permit the movement of the blades 25 and guards 34.

Returning to Figs. 3 and 4, it will be shown that each of the blades 25 comprises a rectangular plate 48 integrally formed at each corner with the triangular points 49 having the cutting edges 50. The blade 25 near its periphery is provided with a circular opening 51 which receives therethrough the externally threaded stud 52 having an enlarged central portion 53 adapted to fit within the cross-shaped slot 54 provided in the plate 48 at the semi-circular end portion thereof. The stud 52 is also provided with the enlarged hemispherical head 55 of greater diameter than slot 54 and which bears on the upper surface of plate 48, a nut 56 being screwed onto the stud below the blade 25.

A multi-edge mower knife of Figs. 3 and 4 has the advantage of swinging or yielding when it strikes an object that is solid and returns to the cutting position when the obstruction is out of the way. The knife has eight cutting blades 50 readily available for use. This gives many times the life of the usual mower knife. It reduces the need for sharpening, which is quite a job for the average user. When one blade is dulled, it can be turned to the next blade. When four have been dulled, the knife is turned over which provides four more for use or a total of eight in all. Best results are obtained if used on the blade as shown in cross section in Fig. 1. The convex shape of the blade 25 gives added strength. It provides clearance and eliminates drag, only the knives are in contact with the material to be cut. The blade 25 also provides a safety feature as the knives are so mounted that should one become disengaged from the rotating disc, it would be directed to the ground, thus reducing the danger to operator or bystander. It will thus be seen that the multi-edged mower knives are rotatably mounted on the enlarged portions 53 of the studs and are retained in the operative position by centrifugal force.

Referring now particularly to Figs. 5 and 6 there is shown a modified form of the multi-edge mower knife providing for removal of the knife for turning over or replacing without removing the bolt and bearing assembly. In this case, a star-shaped plate 57 having four triangular points 58, each provided on opposite faces and opposite edges with the cutting edge 59 is now provided with a cross-shaped slot 60 having the circular and enlarged portions 61 and the central enlarged circular portions 62, substantially as illustrated. The blade 25 is provided with the circular opening which receives therethrough the externally threaded, reduced lower end 63 of a smooth cylindrical stud 64 having the enlarged hemispherical head 65, the smooth portion 64 forming with the reduced externally threaded portion 63 a shoulder 63' which limits the downward displacement of the stud through the disc. The stud is retained in operative position by means of the nut 66 screw threaded onto the lower end thereof on the under surface of the blade 25. A sleeve 67 adapted to fit within the circular and enlargement 61 of the slot 60 but of greater diameter than the remaining portions 61' is slidably positioned on the stud 64 and normally rests on the spacer member 68. Upward displacement of the sleeve 67 relative to the stud 64 and plate 57 is prevented by a cotter pin 69, the upper end of the sleeve 67 being integrally formed with the four equiangularly spaced flanges 70. The blade 57 is rotatably mounted on the stud 64 and sleeve 67 and will swing to an inoperative position when striking a hard object, being returned to the operative position of Fig. 6 by centrifugal action after the obstruction has been passed. To remove the knife for turning over or replacing without removing the stud 64 and bearing assembly, it is only necessary to remove the pin 69 which permits the movement of the sleeve 67 upwardly into abutment with the head 65 and the removal of the sleeve 67 from the circular enlargements 61. The stud 64 can then pass into the slot 60 to permit the centering of the plate 57 with respect to the stud and the rotation of the flanges 70 of the sleeve to the position shown in phantom in Fig. 5, thus permitting the plate to be removed. To replace it, it is only necessary to reverse the above procedure. To move from one knife blade to another, it is only necessary to follow the first two steps outlined above, as will be obvious.

While various changes may be made in the detail construction, it shall be understood that such changes shall be within the spirit and scope of the present invention as defined by the appended claims.

What I claim as new and desire to protect by Letters Patent of the United States is:

1. A rotory mover with retractable blades comprising a plate having a semi-circular end portion at one end and a rectangular end portion at the other, a depending skirt connected to the edge of said plate, said skirt on opposite sides adjacent the straight edge of said plate having laterally aligned openings, said plate adjacent said openings having oppositely disposed transversely extending arcuate slots, a transverse shaft rigidly mounted horizontally above said plate and adjacent said slots, roller means on opposite sides of the straight end of said plate, a first shaft journalled in the center of the semi-circular end of said plate and extending downwardly within said skirt, the semi-circular portion of said skirt being formed with teeth along its lower edge to provide a semi-circular guard, a circular blade secured to the lower end of said shaft adapted for rotary cooperative action with said guard, power means for rotating said first shaft, a pair of second shafts rotatably and slidably mounted within said slots, a circular b'ade secured to the lower end of each of said second shafts and adapted to move through said openings in said skirt, hollow cylindrical guards rotatably mounted on each of said second shafts enclosing said second blades, said guards formed with teeth along their lower edges for cooperative action with the rotating blades therewith, said guards being rotatably mounted on said second shafts whereby the exterior outer portion of said guards are adapted to travel transversely inwardly and outwardly through said lateral aligned openings in said depending skirt, a pair of spring means mounted upon said transverse shaft for exerting outward pressure to said second shafts and for retaining said second shafts at the outer ends of said slots with said second blades in an extended position, said spring means permitting the retraction of said blades and shafts when the guards come in contact with an obstacle as the spring means permit the inward travel motion of said guards relative to the object, and power actuated means intermediate said first and second shafts for driving said second shafts.

2. A rotary mower according to claim 1, said power actuated means for driving said shafts comprising a pair of rigid links, each of said second shafts being journalled in the rear end of each of said links above said plate, a pair of third shafts journalled in said links on opposite ends thereof and on the side of said first shaft remote from said second shafts, belt and pulley means connecting each of said third shafts with said first shaft, and second pulley and belt means connecting each of said third shafts with said second shafts.

3. A rotary mower according to claim 2, said spring means comprising a pair of guides and supports having transverse horizontal bores in the rear ends thereof and slidably mounted on the opposite ends of said transverse shaft mounted above said plate adjacent said slots on the side of the latter remote from said first shaft, a pair of collars rigidly secured to the central portion of said transverse shaft, a coil spring sleeving each end of said transverse shaft intermediate said collars and said guides and supports, said second shafts being journalled in the forward ends of said guides and supports.

4. A rotary grass cutter comprising, in combination, a wheeled frame embodying a top plate having a depending skirt, said top plate having a semicircular portion at one end and a rectangular portion at the opposite end thereof, a first vertical shaft journalled in the center of the semicircular end of said plate and extending downwardly within said skirt, the semicircular portion of said skirt being formed with teeth along its lower edge to provide a semicircular guard, a first type circular blade secured to the lower end of said first shaft adapted for rotary cooperative action with said guard power means for rotating said first shaft, said skirt on opposite sides adjacent the straight edge of said plate having laterally aligned openings, said plate adjacent said openings having oppositely disposed transversely extending arcuate slots, a transverse cylindrical shaft rigidly secured horizontally above said top plate and adjacent said slots, wheels mounted upon shafts journalled on the opposite sides of the rectangular portion of said plate and at the rear thereof, a pair of second vertical shafts rotatably and slidably mounted within said arcuate slots, a second type circular blade secured to the lower end of each of said second shafts, circular guards with depending side walls formed with teeth along their lower edges mounted upon each of said second shafts, said blades on said second shafts adapted for rotary cooperative action with said guards, said guards and blades also adapted to move outwardly and inwardly through said laterally aligned openings in said skirt, power actuated means connected with said first shaft for driving both of said second shafts, and a pair of coil spring means sleeved upon said transverse shaft for exerting outward pressure to said second shafts and independently retaining each of said second shafts at the outer ends of said slots with said second blades in an extended position and adapted to permit the retraction of either of said second blades and shafts when said circular guards mounted upon said second shafts come in striking impact with an obstacle.

References Cited in the file of this patent
UNITED STATES PATENTS

| | | |
|---|---|---|
| 2,114,096 | Noel | Apr. 12, 1938 |
| 2,791,081 | Allen et al. | May 7, 1957 |